(12) United States Patent
Ritamaki et al.

(10) Patent No.: US 7,994,995 B2
(45) Date of Patent: Aug. 9, 2011

(54) TRANSPONDER TUNING METHOD AND A TRANSPONDER

(75) Inventors: Matti Ritamaki, Nokia (FI); Heikki Ahokas, Tampere (FI)

(73) Assignee: UPM Raflatac Oy, Tampere (FI)

( * ) Notice: Subject to any disclaimer, the term of this patent is extended or adjusted under 35 U.S.C. 154(b) by 575 days.

(21) Appl. No.: 11/884,364

(22) PCT Filed: Feb. 6, 2006

(86) PCT No.: PCT/FI2006/050051
§ 371 (c)(1),
(2), (4) Date: Jun. 25, 2008

(87) PCT Pub. No.: WO2006/087423
PCT Pub. Date: Aug. 24, 2006

(65) Prior Publication Data
US 2008/0316129 A1    Dec. 25, 2008

(30) Foreign Application Priority Data

Feb. 17, 2005  (FI) ...................................... 20050191

(51) Int. Cl.
*H01Q 9/00*    (2006.01)
(52) U.S. Cl. ......................... 343/745; 343/895; 343/795
(58) Field of Classification Search .................. 343/745, 343/747, 741, 742, 895, 793, 795, 802; 29/600
See application file for complete search history.

(56) References Cited

U.S. PATENT DOCUMENTS

| | | | |
|---|---|---|---|
| 5,337,063 A | 8/1994 | Takahira | |
| 6,285,342 B1 * | 9/2001 | Brady et al. | .................. 343/895 |
| 2003/0080919 A1 * | 5/2003 | Forster et al. | .................. 343/895 |
| 2003/0117334 A1 * | 6/2003 | Forster et al. | .................. 343/793 |
| 2005/0024287 A1 | 2/2005 | Jo et al. | |
| 2006/0054710 A1 * | 3/2006 | Forster et al. | .................. 235/492 |
| 2006/0055542 A1 * | 3/2006 | Forster et al. | .............. 340/572.7 |

FOREIGN PATENT DOCUMENTS

| | | |
|---|---|---|
| JP | 2000285214 A | 10/2000 |
| JP | 2001016022 A | 1/2001 |
| JP | 2001251114 A | 9/2001 |
| JP | 2004078768 A | 3/2004 |
| JP | 2004153717 A | 5/2004 |
| JP | 2004295793 A | 10/2004 |
| JP | 2005-33587 A | 2/2005 |
| WO | WO-2004/093243 A2 | 10/2004 |
| WO | WO-2005/004044 A1 | 1/2005 |

OTHER PUBLICATIONS

PCT/ISA/210—International Search Report—May 15, 2006. Communication Pursuant to Article 94(3) EPC, dated Aug. 3, 2010, from the European Patent Office, issued in counterpart application EP06708955.7-1248.
Japanese Patent Office Action, dated Mar. 1, 2011, issued in connection with counterpart Japanese Patent Application No. 2007-555652.
First Office Action issued on Dec. 6, 2010, from the State Intellectual Property Office, P.R. China, in connection with counterpart Chinese Application No. 200680012727.5.

* cited by examiner

*Primary Examiner* — HoangAnh T Le
(74) *Attorney, Agent, or Firm* — Venable LLP; Eric J. Franklin

(57) ABSTRACT

Tuning an antenna circuit that includes an inductance of a resonance circuit, and a component having a component impedance. The antenna circuit includes multiple connection areas for connecting the component to the antenna circuit At least two of the multiple of connection areas are part of the resonance circuit. The tuning can be performed by selecting at least one connection area for the component among the at least two of the multiple connection areas

14 Claims, 3 Drawing Sheets

TRANSPONDER TUNING METHOD AND A TRANSPONDER

CROSS-REFERENCE TO RELATED APPLICATIONS

This application claims priority to Finnish patent application 20050191 filed 17 Feb. 2005 and is the national phase under 35 U.S.C. §371 of PCT/FI2006/050051 filed 6 Feb. 2006.

FIELD OF THE INVENTION

The present invention relates to a manufacturing method for an antenna circuit comprising forming an inductance of a resonance circuit to the antenna circuit. The invention also relates to a method for tuning an antenna circuit which comprises an inductance of a resonance circuit, and a component comprising a chip impedance. The invention further relates to an antenna circuit which comprises an antenna impedance of a resonance circuit, and a component comprising a component impedance. The invention further relates to a transponder which comprises an inductance of a resonance circuit, and a component comprising a component impedance.

BACKGROUND OF THE INVENTION

Antenna circuits are implemented, for example, in transponders for different applications. A transponder is usually a small-sized equipment which comprises an antenna circuit. The antenna circuit usually comprises a resonance circuit and may also comprise an antenna, or eg the coil of the resonance circuit operates as an antenna. The transponder may further comprise a chip to/from which information can be wirelessly stored/read. The information is stored into a memory of the chip or generated e.g. by a logical circuit of the chip upon request. The energy is usually externally provided to the transponder by the reader when information is to be stored into or read from the chip. The energy is supplied to the transponder as a radio frequency (RF) energy. The antenna of the transponder receives the energy. The antenna is part of the resonance circuit wherein the energy must have a certain frequency. In the transponder the received energy is usually stored to an energy storage such as a capacitor. The stored energy suffices for the information storage/reading operation when the resonance circuit and the transmission frequency of the reader are near each other i.e. the resonance circuit is tuned to the transmission frequency of the reader.

There are different systems in which transponders are utilized. However, the transmission frequencies are not the same in every system. Therefore, different resonance frequencies are needed in transponders of different systems. Moreover, tolerances in the manufacturing processes of the transponders can affect that the resonance frequencies need to be tuned before the transponder is ready for use. For example, the input impedance of the chip may vary in different production batches. Further, the input impedances of the chips of different manufacturers may vary so largely that similar chips from different manufacturers can not be used with the same antenna circuit. Also the coil/antenna manufacturing and chip assembly processes may affect variations in the joint impedances which affect the resonance frequency of the transponder.

There are also other factors which may affect the resonance frequency of the transponder. For example when the transponder is placed into a housing the material of the housing may change the resonance frequency. Further, the application in which the transponder will be used may affect to the resonance frequency. Some materials such as plastics have more effect to the resonance frequency than some other materials such as cardboard. When the transponder is operating at UHF area (Ultra High Frequencies) the resonance frequency may drop about 50-100 MHz on plastic application or about 10-20 MHz on cardboard application. The same phenomenon exists also on transponders operating at HF frequencies.

There are some prior art tuning methods in which the inductance of the coil of the resonance circuit is changed by mechanically altering the coil. For example, a coil may have a number of short-circuits which can be broken to change the inductance of the coil. Hence, the transponder is measured and if it is not in resonance, one short-circuit is broken. After that the resonance frequency is measured again and another short-circuit is broken if necessary. This kind of tuning method is time consuming and needs extra production steps.

Another drawback in prior art is that the same antenna and/or coil can not be used in different kinds of systems but each system needs a specific antenna and/or coil.

SUMMARY OF THE INVENTION

The present invention provides an improved method for tuning the resonance frequency of the resonance circuit, an antenna circuit, and a transponder. The invention is based on the idea that the antenna circuit is provided with multiple of connection areas for a component such as a chip so that at least two such connection areas result a different resonance frequency when the component is assembled to such connection areas. Therefore, the selection of connection areas for connecting a component to the antenna circuit can be used to select the resonance frequency for the antenna circuit. To put it more precisely, the manufacturing method according to the present invention is primarily characterised in that the method comprises forming a multiple of connection areas for connecting a component to the antenna circuit, at least two of said multiple of connection areas being part of the resonance circuit. The tuning method according to the present invention is primarily characterised in that the antenna circuit comprises a multiple of connection areas for connecting a component to the antenna circuit, at least two of said multiple of connection areas being part of the resonance circuit, wherein the method comprises selecting at least one connection area for the chip amongst said at least two of said multiple of connection areas. The antenna circuit according to the present invention is primarily characterised in that the antenna circuit further comprises a multiple of connection areas for connecting a component to the antenna circuit the component comprising a component impedance, at least two of said multiple of connection areas being part of the resonance circuit. The transponder according to the present invention is primarily characterised in that the antenna circuit further comprises a multiple of connection areas for connecting the component to the transponder, at least two of said multiple of connection areas being part of the resonance circuit.

The invention provides advantages compared to prior art methods, antenna circuits and transponders. When producing the transponders according to the present invention it is not necessary to measure the resonance frequency of all the transponders of a production batch but only one or few of them because the materials and the process have a quite uniform quality. The other transponders are produced according to the measurements of the one or few samples of the transponders of the production batch. In other words, the connection areas for the chip are selected according to the measurements and all the other transponders of the same batch can be manufactured accordingly. When a different resonance frequency is needed, another connection area(s) is/are selected for the chip. The antenna circuit can comprise many connection areas in a way that the difference between the smallest and highest resonance frequency that can be achieved by the selection of the connection area of the chip can be very large. Thus, the same antenna circuits can be used in many different transponders. Therefore, bigger manufacturing volumes of similar antenna circuits can be achieved. The transponders can also be mass tailored according to the needs of customers who will use the transponders in their products, for example. One further advantage to mention is that the tuning is simpler than in prior art methods.

Same antenna circuit can be used in different technology chip attachment lines. High quality lines produce transponders with smaller parasitic capacitances, which will increase the resonance frequency. Many connection areas enable to produce optimized transponders in many production lines.

DESCRIPTION OF THE DRAWINGS

In the following the invention will be described in more detail with reference to the appended drawings in which.

DETAILED DESCRIPTION OF THE INVENTION

Figure 1A:
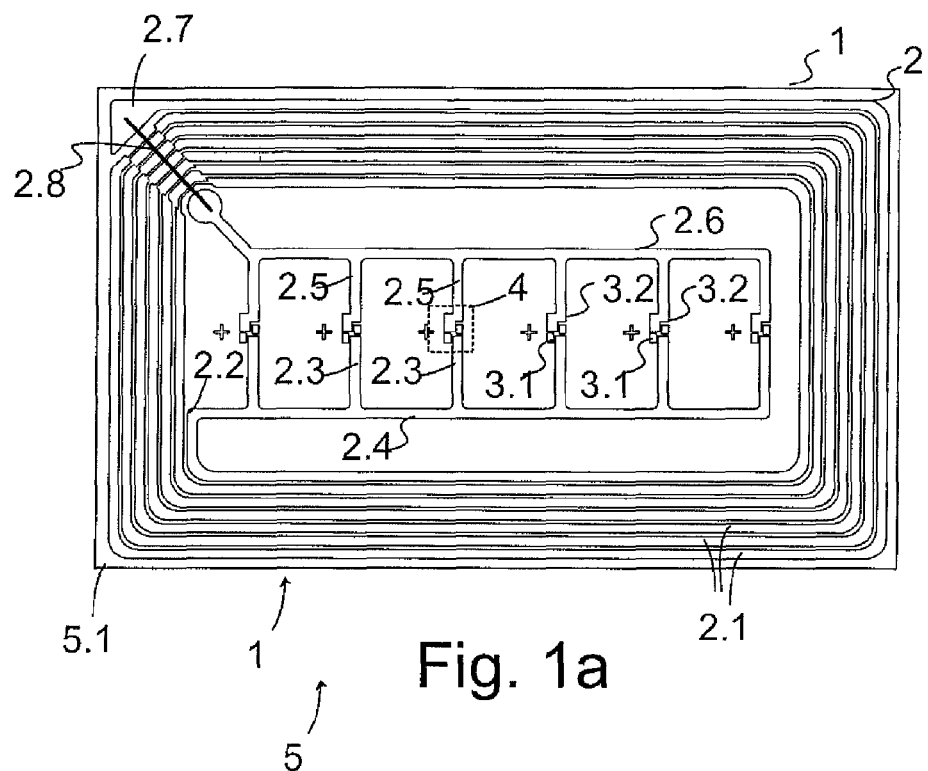
FIGS. 1a, 1b and 1c depict different example patterns for the inductance and the connection areas of a transponder according to the present invention.

In FIG. 1a there is depicted an example of a antenna circuit 1 comprising a coil 2 of a resonance circuit and connection areas 3.1, 3.2 (such as connection pads, jointing pads, etc) for a component 4 (shown as a dotted square in FIG. 1a). The component 4 is, for example, a chip or a module comprising a chip. It is obvious that there may be more than one component and multiple connection areas for one or more of the plurality of components, as well. The antenna circuit 1 is formed on a substrate 5.1. This kind of antenna circuit is especially suitable for HF frequencies, ie frequencies between about 3 MHz to 30 MHz, typically about 13.56 MHz. The coil 2 has a number of loops 2.1 to achieve a certain basis inductance. At the first end 2.2 of the coil 2 there are a number of short conductors 2.3 connected to the coil 2 by a conductor 2.4. At the other end of the each conductor 2.3 there is a connection area 3.1 for the component 4. Near each of these connection areas 3.1 there is another connection area 3.2 for the component 4. Those other connection areas 3.2 are formed at the end of another set of conductors 2.5 which in turn are electrically connected together by a conductor 2.6. This conductor 2.6 is connected to the other end 2.7 of the coil by a wire 2.8, for example. The component 4 has two or more connection elements, such as leads, connection pads, etc for connecting the component 4 to the other electronic circuitry. When the component 4 is eg bonded at the connection elements to the connection areas of the transponder, the component is fixed to the transponder and usually no other fixing means are necessary.

The component 4 can be connected to any of the pair of adjacent connection areas 3.1, 3.2. Inside the component 4 there are usually rectifier diodes and other semiconductor components (e.g. switching transistors, memory, etc., not shown in FIG. 1a) which typically affect that there exists a capacitive input impedance. The connection areas 3.1, 3.2 for the component 4 are selected according to the resonance frequency designed for the transponder 5. In the embodiment of FIG. 1a the highest resonance frequency can be achieved by joining the component to the pair of connection areas which form the longest coil i.e. the connection areas which are at the right end of the conductors 2.6 in FIG. 1a, because the area of the coil becomes smaller in this alternative. Respectively, the lowest resonance frequency can be achieved by joining the component 4 to the pair of the connection areas which form the shortest coil i.e. the leftmost pair of connection areas in FIG. 1a, because the area of the coil becomes larger in this alternative.

Figure 1B:
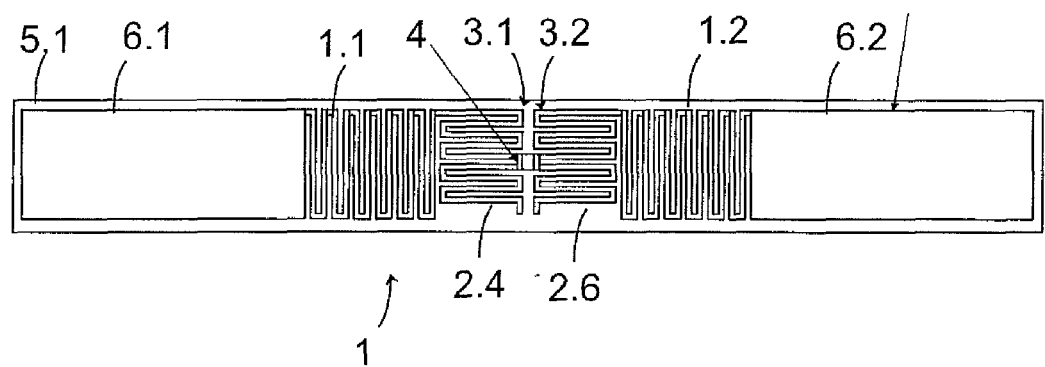

In FIG. 1b another example of the antenna circuit 1 according to the present invention is shown. This kind of antenna circuit is especially suitable for UHF frequencies, ie frequencies over 300 MHz up to 3000 MHz, typically around 900 MHz. In this embodiment the coil 2 is electrically as a dipole antenna having two radiators 6.1, 6.2. In both radiators 6.1, 6.2 of the dipole antenna there are lengthening coils 1.1, 1.2 which increase the electric length of the dipole antenna. At the other end of the lengthening coils 1.1, 1.2 there are conductors 2.4, 2.6 and a number of connection areas 3.1, 3.2 in different locations of the conductors 2.4, 2.6. The connection areas 3.1, 3.2 allow the selection of the connection area of the component 4 in the similar way than in the above described example of FIG. 1a. The selection of the connection area affects to the inductance of the resonance circuit which is mainly formed by the dipole antenna and the capacitance between the conducting points of the component 4.

In principle there are at least two ways to affect to the inductance to the antenna circuit. One is to change the operational (electric) length of the antenna and another way is to change serial inductance of the antenna circuit. It is also possible to use both of them.

Figure 1C:
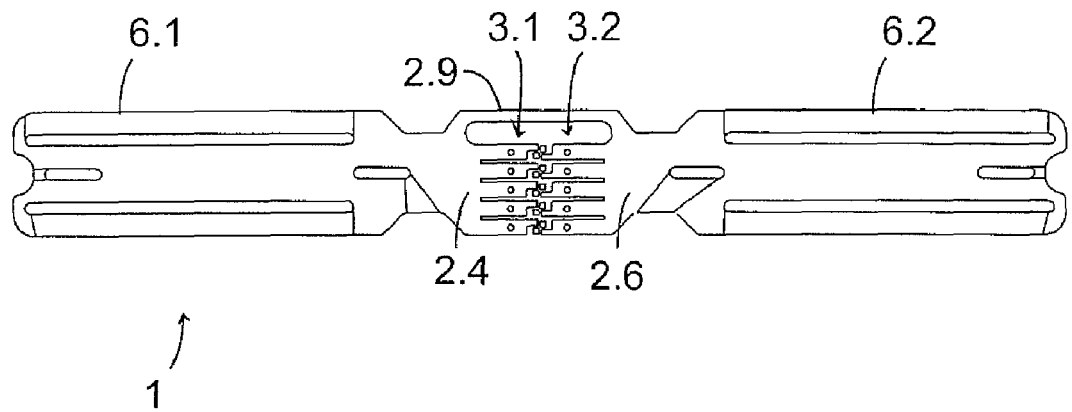

In FIG. 1c yet another example of the antenna circuit 1 according to the present invention is shown. This kind of antenna circuit is also especially suitable for UHF frequencies. The coil or antenna 1 is electrically as a dipole antenna having two radiators 6.1, 6.2. At one end of the radiators 6.1, 6.2 there are conductors 2.4, 2.6 and a number of connection areas 3.1, 3.2 in different locations of the conductors 2.4, 2.6. The connection areas 3.1, 3.2 allow the selection of the connection area for the component 4 in the similar way than in the above described examples of FIGS. 1a and 1b. The selection of the connection area affects to the area of the loop which is formed by the selected connection areas 3.1, 3.2, the conductors 2.4, 2.6 and the loop conductor 2.9. Therefore, the inductance of the resonance circuit is also varied according to the selection of the connection areas 3.1, 3.2 for the component 4.

Figure 2:
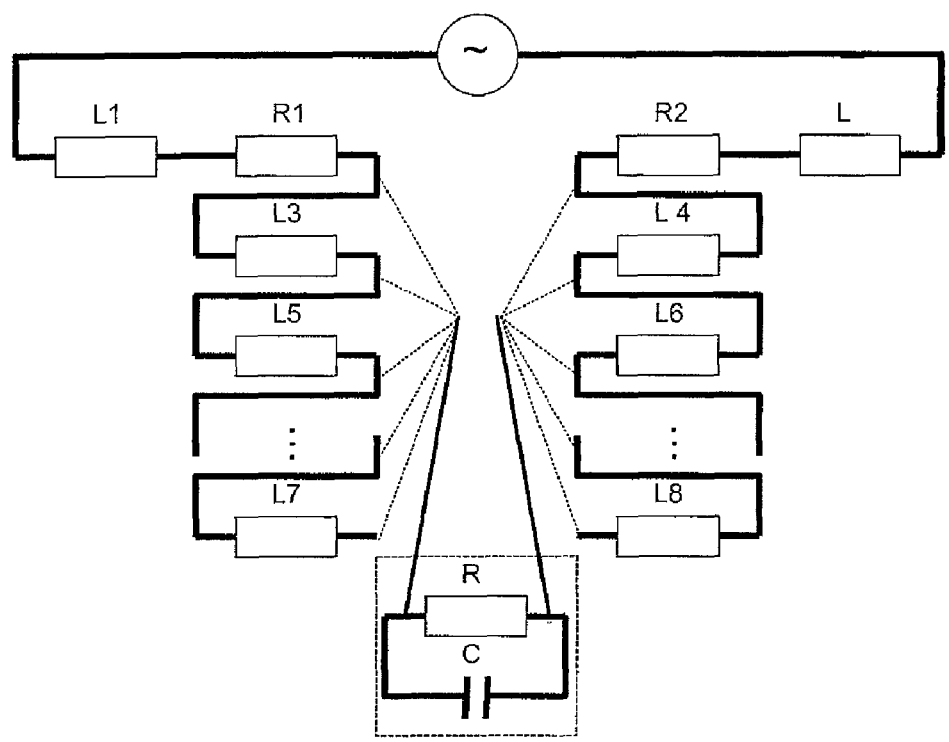
FIG. 2 depicts the equivalent circuit of the resonance circuit of an example embodiment of the transponder.

FIG. 2 depicts an equivalent circuit of an example of the antenna circuit 1 of FIG. 1 b according to the present invention. There are the inductances L1, L2 which consist of the radiators 6.1, 6.2 and the lengthening coils 1.1, 1.2. There is also some resistance in the coils, radiators and conductors which is represented as resistors R1, R2 in FIG. 2. The resistances consist inter alia of loss resistance and radiation resistance. Each of the conductors connecting two connection areas 3.1, 3.2 also have some inductance L3-L8. The component 4 has some capacitive input impedance R, C which affect the operation of the circuit of the transponder. The energy generator 7 represents the reader or some other device which produces the RF energy for the transponder. Although the generator 7 is shown as connected to the antenna in FIG. 2, the generator 7 is not connected to the transponder 5 in normal operation but the energy is radiated from the generator to the transponder 5.

Mathematically the effect of the selection of the connection points to which the component is assembled can be presented, for example, by the following equation:

$$f_C = \frac{1}{2\pi\sqrt{C(L_{ant} + \Sigma L_{connectionpoint})}}$$

In the equation the term $f_C$ represents the resonance frequency, C represents the capacitance of the input impedance of the component, the term $L_{ant}$ represents the inductance of the radiators, and the term $\Sigma L_{connectionpoint}$ represents the sum of the inductances of the connection points which are selected for connecting the component 4 to the antenna circuit 1.

Figure 3:
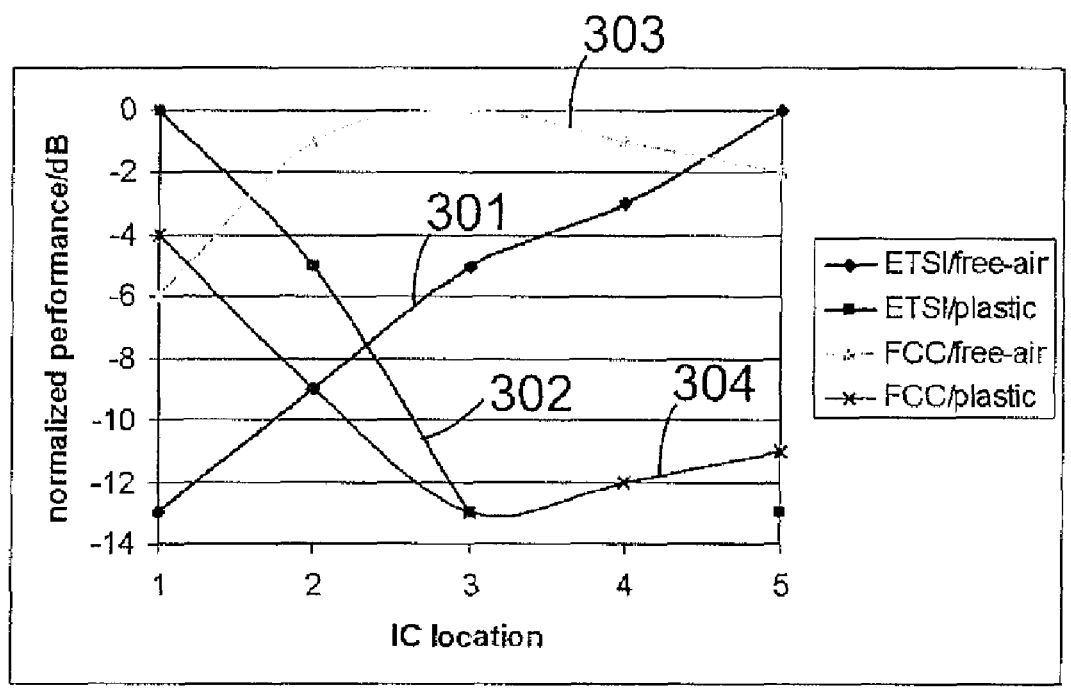
FIG. 3 depicts measurement results of the effects of different connection areas to the impedance of the resonance circuit.

FIG. 3 depicts some measurement results of an example embodiment of the present invention. In FIG. 3 the curve 301 represents the normalised performance as a function of selected connection points (IC location) at a first frequency area (869 MHz) when the antenna circuit is in free air ie it is not attached to the application material. In this non-restrictive example five selectable locations have been measured. It can be seen that in this example the best results are achieved when the component is connected to the fifth pair of connection areas. The curve 302 represents the normalised performance as a function of selected connection points at the first frequency area (869 MHz) when the antenna circuit is covered by a plastic plate. In this alternative the best results are achieved when the component is connected to the first pair of connection areas. The curve 303 represents the normalised performance as a function of selected connection points at a second frequency area (902 MHz-928 MHz) when the antenna circuit is in free air. In this alternative the third pair of connection areas gives the best results. The curve 304 represents the normalised performance as a function of selected connection points at the second frequency area (902 MHz-928 MHz) when the antenna circuit is covered by a plastic plate. In this alternative the first pair of connection areas gives the best results.

A number of prior art manufacturing methods can be used in manufacturing the antenna circuits of the present invention. It should also be mentioned that the different parts of the resonance circuit on the antenna circuit 1, such as coils 2, radiators 6.1, 6.2, conductors 2.4, 2.6, connection areas 3.1, 3.2, can be manufactured in the same phase. Therefore, no extra steps are needed for providing the tuning possibility for the transponder 5. The component 4 can also be joined to the antenna circuit 1 by using soldering, adhesive or any suitable method known as such. The component 4 can also be formed as a module which is then attached to the transponder. Such a module comprises, for example, a substrate in a strap form in which the necessary electrical connections are arranged for electrically connecting the chip of the module to the transponder. This kind of module containing the chip can also be called as a strap or a strap module, for example.

The resonance frequency can vary in large scale. For example, the transponder 5 can be designed to operate at 869 MHz systems and at 915 MHz systems which are common frequencies in UHF frequency area. The invention is also applicable at HF frequencies, typically 13.56 MHz.

An antenna circuit according to the invention may include radiators, lengthening coils connected at one end to the radiators and at the other end to one of the connection areas, and a conductor configured to connect the connection areas to another connection area, wherein the a conductor has an impedance. Additionally, the antenna circuit according to the invention may also include radiators connected at one end to the connection areas, and a loop conductor between the radiators, wherein the connection areas are formed in such a way that each connection area together with the loop conductor forms a loop, and wherein the area of the cross section of the loops differs from each other. Furthermore, a transponder according to the invention may include radiators connected at one end to the connection areas, and a loop conductor between the radiators, wherein the connection areas are formed in such a way that each connection area together with the loop conductor forms a loop, and wherein the area of the cross section of the loops differs from each other.

There are many application areas for the present invention. As a non-limiting example of the application areas the transponder can be made for so called RFID applications (Radio Frequency Identification).

The present invention is not solely limited to the above illustrated examples but it can be modified within the scope of the appended claims.

The invention claimed is

1. A method for manufacturing an antenna circuit comprising an inductance of a resonance circuit, the method comprising:
forming multiple alternative connection areas for connecting a component to the antenna circuit, at least two of said multiple of connection areas being part of the resonance circuit;
forming said inductance of the resonance circuit as a dipole antenna comprising two radiators, said radiators comprising at least a first end and a second end;
forming a conductor between said second end of each of said two radiators and said multiple of alternative connection areas;
connecting the component to at least two of said multiple of alternative connection areas;
forming a loop conductor between said radiators, and forming the connection areas in such a way that each connection area together with the conductors and the loop conductor forms a loop.

2. The method according to claim 1, further comprising:
using a chip as said component.

3. The method according to claim 1, further comprising:
using a module comprising a chip as said component.

4. The method according to claim 1, further comprising:
forming a coil to the resonance circuit the coil comprising at least a first end and a second end, and
forming said multiple connection areas for a chip at said second end of the coil.

5. The method according to claim 1, further comprising:
forming a dipole antenna comprising two radiators to the antenna circuit, and
forming lengthening coils to connect the radiators of the dipole with said multiple of connection areas for a chip.

6. An antenna circuit, comprising:
an inductance of a resonance circuit, wherein said inductance of the resonance circuit comprises a dipole antenna comprising two radiators, wherein said radiators comprise a first end and a second end;
a component comprising a component impedance,
multiple alternative connection areas for connecting the component to the antenna circuit, wherein at least two of said multiple of connection areas are part of the resonance circuit, wherein the component is connected to at least two of said multiple of alternative connection areas:
a conductor between said second end of each of said two radiators and said multiple of alternative connection areas; and a loop conductor between said radiators, wherein each connection area together with the conductors and the loop conductor forms a loop.

7. The antenna circuit according to claim 6, further comprising:
   radiators,
   lengthening coils connected at one end to the radiators and at the other end to one of the connection areas, and
   a conductor configured to connect the connection areas to another connection area, wherein the a conductor has an impedance.

8. The antenna circuit according to claim 6 further comprising:
   radiators connected at one end to the connection areas, and
   a loop conductor between the radiators,
   wherein the connection areas are formed in such a way that each connection area together with the loop conductor forms a loop, and wherein the area of the cross section of the loops differs from each other.

9. A transponder, comprising:
   an inductance of a resonance circuit, wherein said inductance of the resonance circuit is a dipole antenna comprising two radiators, said radiators comprising at least a first end and a second end;
   a component comprising a component impedance, and
   multiple alternative connection areas for connecting the component to the transponder, at least two of said multiple connection areas being part of the resonance circuit, wherein the component is connected to at least two of said multiple of alternative connection areas;
   a conductor between said second end of each of said two radiators and said multiple of alternative connection areas; and
   a loop conductor between said radiators, wherein each connection area together with the conductors and the loop conductor forms a loop.

10. The transponder according to claim 9, wherein the component is a chip.

11. The transponder according to claim 9, wherein the component is a module comprising a chip.

12. The transponder according to claim 9, further comprising:
   radiators,
   lengthening coils connected at one end to the radiators and at the other end to one of the connection areas, and
   a conductor configured to connect the connection areas to another connection area, wherein the conductor has an impedance.

13. The transponder according to claim 9, further comprising:
   radiators connected at one end to the connection areas, and
   a loop conductor between the radiators,
   wherein the connection areas are formed in such a way that each connection area together with the loop conductor forms a loop, and wherein the area of the cross section of the loops differs from each other.

14. The transponder according to claim 9, wherein said component comprises a module which comprises a chip, wherein the module is attached with the transponder.

* * * * *